United States Patent
Kim et al.

(10) Patent No.: US 10,968,506 B2
(45) Date of Patent: Apr. 6, 2021

(54) HIGH-MANGANESE HOT-DIP ALUMINUM-COATED STEEL SHEET HAVING EXCELLENT COATING ADHESION

(71) Applicant: POSCO, Pohang-si (KR)

(72) Inventors: Heung-Yun Kim, Gwangyang-si (KR); Hyeon-Seok Hwang, Gwangyang-si (KR); Young-Ha Kim, Gwangyang-si (KR)

(73) Assignee: POSCO, Pohang-si (KR)

(*) Notice: Subject to any disclaimer, the term of this patent is extended or adjusted under 35 U.S.C. 154(b) by 253 days.

(21) Appl. No.: 16/064,735

(22) PCT Filed: Dec. 23, 2016

(86) PCT No.: PCT/KR2016/015171
§ 371 (c)(1),
(2) Date: Jun. 21, 2018

(87) PCT Pub. No.: WO2017/111533
PCT Pub. Date: Jun. 29, 2017

(65) Prior Publication Data
US 2019/0010597 A1    Jan. 10, 2019

(30) Foreign Application Priority Data

Dec. 24, 2015 (KR) .................. 10-2015-0186145

(51) Int. Cl.
*C23C 2/12* (2006.01)
*C23C 2/40* (2006.01)
(Continued)

(52) U.S. Cl.
CPC .............. *C23C 2/12* (2013.01); *B32B 15/012* (2013.01); *C22C 38/002* (2013.01);
(Continued)

(58) Field of Classification Search
None
See application file for complete search history.

(56) References Cited

U.S. PATENT DOCUMENTS

| | | |
|---|---|---|
| 2005/0123786 A1 | 6/2005 | Honda et al. |
| 2009/0053556 A1 | 2/2009 | Sohn et al. |

(Continued)

FOREIGN PATENT DOCUMENTS

| | | |
|---|---|---|
| CN | 101346480 | 1/2009 |
| CN | 101346489 | 1/2009 |

(Continued)

OTHER PUBLICATIONS

European Search Report—European Application No. 16879400.6 dated Oct. 23, 2018, citing WO 2009/084792, US 2013/295409, US 2011/300407, US 2005/123786 and JP 3 485411.

(Continued)

*Primary Examiner* — Daniel J. Schleis
(74) *Attorney, Agent, or Firm* — Cantor Colburn LLP

(57) ABSTRACT

Provided is a high-manganese hot-dip aluminum-coated steel sheet comprising: a base steel sheet containing, by weight, 5% to 35% of Mn, 0.3 to 6% of Al, 0.1 to 1.2% of Si, the balanced amount of Fe, and inevitable impurities; a hot-dip aluminum-coated layer, formed on a surface of the base steel sheet, containing, by weight, 3 to 12% of Si and the balanced amount of Al, and inevitable impurities; and an alloy layer, 0.1 to 10 μm in thickness with a Fe—Al—Si—Mn-based alloy phase on an interface between the base steel sheet and the hot-dip aluminum-coated layer, containing, by weight, 40 to 70% of Al, 2 to 13% of Si, 3 to 9% of Mn, the balance amount of Fe, and inevitable impurities.

7 Claims, 1 Drawing Sheet

(51) Int. Cl.

| | | |
|---|---|---|
| *C22C 38/02* | (2006.01) | |
| *C22C 38/04* | (2006.01) | |
| *C22C 38/06* | (2006.01) | |
| *C22C 38/00* | (2006.01) | |
| *C22C 38/38* | (2006.01) | |
| *C23C 2/28* | (2006.01) | |
| *C22C 38/14* | (2006.01) | |
| *C22C 38/12* | (2006.01) | |
| *B32B 15/01* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *C22C 38/32* | (2006.01) | |

(52) U.S. Cl.
CPC ............ *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/22* (2013.01); *C22C 38/24* (2013.01); *C22C 38/26* (2013.01); *C22C 38/28* (2013.01); *C22C 38/32* (2013.01); *C22C 38/38* (2013.01); *C23C 2/28* (2013.01); *C23C 2/40* (2013.01); *Y10T 428/12757* (2015.01)

(56) References Cited

U.S. PATENT DOCUMENTS

| | | |
|---|---|---|
| 2009/0074605 A1 | 3/2009 | Kim et al. |
| 2009/0202382 A1 | 8/2009 | Kim et al. |
| 2011/0017361 A1 | 1/2011 | Meurer et al. |
| 2011/0300407 A1 | 12/2011 | Cho et al. |
| 2013/0177780 A1 | 7/2013 | Park et al. |
| 2013/0295409 A1* | 11/2013 | Chin .................. C23C 2/28 428/653 |
| 2014/0308156 A1 | 10/2014 | Oh et al. |
| 2015/0225829 A1 | 8/2015 | Fujita et al. |

FOREIGN PATENT DOCUMENTS

| | | |
|---|---|---|
| CN | 101432456 | 5/2009 |
| CN | 101760712 | 6/2010 |
| CN | 102348824 | 2/2012 |
| CN | 103282532 | 9/2013 |
| CN | 103370434 | 10/2013 |
| CN | 103917681 | 7/2014 |
| CN | 104508169 | 4/2015 |
| JP | 08277453 | 10/1996 |
| JP | H08277453 | * 10/1996 |
| JP | 10152764 | 6/1998 |
| JP | 2000282204 | 10/2000 |
| JP | 2001131725 | 5/2001 |
| JP | 2007107050 | 4/2007 |
| JP | 2011214145 | 10/2011 |
| JP | 2014501852 | 1/2014 |
| KR | 20070067593 | 6/2007 |
| KR | 20090038756 | * 4/2009 |
| KR | 20100113134 | 10/2010 |
| KR | 20120048399 | 5/2012 |
| KR | 20120065464 | 6/2012 |
| KR | 20140014500 | 2/2014 |
| KR | 20140131203 | 11/2014 |
| WO | 2009084792 | 7/2009 |

OTHER PUBLICATIONS

Chinese Office Action—Chinese Application No. 201680076315.1 dated Jul. 23, 2019, citing CN103370434, JPH08277453, WO2009/084792, CN102348824, CN101346480, CN101346489, CN103917681, CN104508169, CN101432456, CN103282532, CN101760712, JP2011214145, JPH10152764 and KR20140131203.

Japanese Office Action—Japanese Application No. 2018-532607 dated Jul. 9, 2019, citing JP 2014-501852, JP 2007-107050 and Yamaguchi.

Yamaguchi, et al., Composition and Corrosion Behavior of Hot-dip Al—Si—Mg Alloy Coated Steel Sheets, Tetsu-to-Hagane, vol. 99, Sep. 2013, pp. 617-624.

* cited by examiner

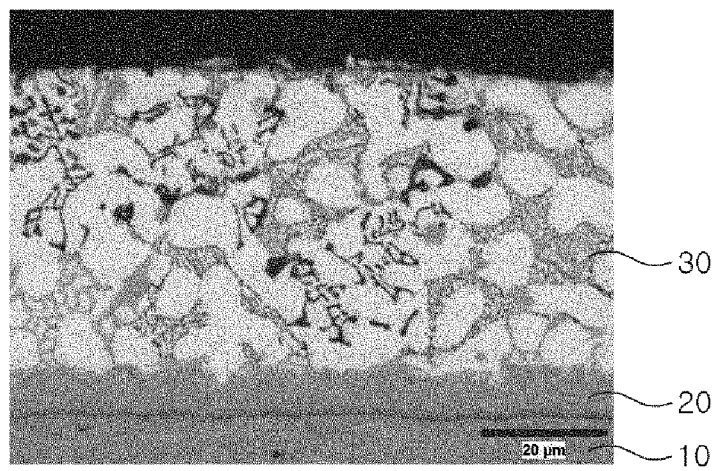

HIGH-MANGANESE HOT-DIP ALUMINUM-COATED STEEL SHEET HAVING EXCELLENT COATING ADHESION

TECHNICAL FIELD

The present disclosure relates to a high-manganese hot-dip aluminum-coated steel sheet having excellent coating adhesion.

BACKGROUND ART

In order to improve the fuel efficiency of automobiles, reducing the weight of automobile bodies has emerged as an important issue. To meet this requirement, many kinds of high strength automotive steels have been developed. Most steel sheets have a relationship of an inverse proportion in which an increase in strength reduces ductility, which, thus, entails many restrictions and cost increases in processing. A lot of studies have been made into improving the ductility of high strength steels, and an austenitic twinning induced plasticity (TWIP) steel which remarkably improves ductility by configuring 5 to 35% of manganese in steel such that TWIN is induced during plastic deformation has been proposed.

Meanwhile, manganese has a high ionization tendency, and steel having a high content of manganese is more easily corroded than general steel. Among various methods of protection against corrosion, metal plating is an effective method of protecting steel.

A hot-dip galvanized steel sheet is known as a sheet having metal plating to provide corrosion resistance to a high manganese steel material. For example, Korean Patent Laid-Open Publication No. 2007-0067593 discloses a coated steel sheet having improved corrosion resistance by forming a hot-dip galvanized layer or an alloy hot-dip galvanized layer on a base steel sheet including a large amount of manganese. Also, Korean Patent Laid-Open Publication No. 2012-0048399 discloses a technique of forming a Mn—Ni—Fe—Al—Si—Zn alloy phase to improve coating adhesion of a base steel sheet including a large amount of manganese.

DISCLOSURE

Technical Problem

An aspect of the present disclosure is to provide a high-manganese hot-dip aluminum-coated steel sheet having excellent coating adhesion.

Technical Solution

According to an aspect of the present disclosure, a high-manganese hot-dip aluminum-coated steel sheet includes: a base steel sheet including, by weight, 5 to 35% of Mn, 0.3 to 6% of Al, 0.1 to 1.2% of Si, and a balance of Fe and inevitable impurities; a hot-dip aluminum-coated layer formed on a surface of the base steel sheet and including, by weight, 3 to 12% of Si, a balance of Al, and inevitable impurities; and an alloy layer including an Fe—Al—Si—Mn-based alloy phase and having a thickness of 0.1 to 10 μm and included on an interface between the base steel sheet and the hot-dip aluminum-coated layer, wherein the alloy layer includes, by weight, 40 to 70% of Al, 2 to 13% of Si, 3 to 9% of Mn, and a balance of Fe and inevitable impurities.

Advantageous Effects

As set forth above, the high-manganese hot-dip aluminum-coated steel sheet according to an exemplary embodiment in the present disclosure has excellent coating adhesion.

DESCRIPTION OF DRAWINGS

FIG. 1 is a photograph of a cross-section of a high-manganese hot-dip aluminum-coated steel sheet according to an exemplary embodiment of the present disclosure, observed by a scanning electron microscope (field emission scanning electron microscope (FE-SEM)).

BEST MODE FOR INVENTION

Hereinafter, a high-manganese hot-dip aluminum-coated steel sheet having excellent coating adhesion according to one aspect of the present disclosure will be described in detail.

FIG. 1 is a photograph of a cross-section of a high-manganese hot-dip aluminum-coated steel sheet according to an exemplary embodiment of the present disclosure, observed by a scanning electron microscope (field emission scanning electron microscope (FE-SEM)).

Referring to FIG. 1, a hot-dip aluminum-coated steel sheet according to an embodiment of the present disclosure includes a base steel sheet 10, an alloy layer 20, and a hot-dip aluminum-coated layer 30 in sequence.

The base steel sheet 10 contains, by weight, 5 to 35% of Mn, 0.3 to 6% of Al, 0.1 to 1.2% of Si, a balance of Fe and inevitable impurities.

Manganese (Mn): 5 to 35 wt %

Manganese is an indispensable element to stabilize an austenite structure to induce twins in plastic deformation, thereby remarkably improving steel strength and ductility. In order to obtain such effects in the present disclosure, 5 wt % or more of manganese is preferably included and, 9 wt % or more of manganese may be more preferably included. However, if the MN content is excessive, high temperature ductility is lowered to cause cracking during casting and high temperature oxidation in reheating for hot rolling, to deteriorate surface quality of a product. Therefore, an upper limit of the MN content is preferably 35 wt %, and, more preferably, 18 wt %.

Aluminum (Al): 0.3 to 6 wt %

Aluminum is an element generally added for the deoxidation of steel, but in the present disclosure, aluminum is an element added for improving ductility of steel. That is, aluminum increases stacking fault energy on a slip surface of the steel to suppress formation of a ε-martensite structure to improve ductility of the steel. If the aluminum content is too low, the ε-martensite structure is formed and strength is increased but ductility may be drastically lowered. Therefore, 0.3 wt % or more of Al is preferably included and, more preferably, at least 1.0 wt % or more of Al is included. However, if the aluminum content is excessive, generation of twinning is suppressed to reduce ductility and continuous casting characteristics and surface oxidation is severely caused during hot rolling to lower surface quality of the product. Furthermore, surface concentration of Al may deteriorate wettability of hot dipping and make it difficult to form an intended alloy layer. Therefore, an upper limit of the aluminum content is preferably 6 wt %, more preferably 4.5 wt %, and most preferably 3.5 wt %.

Si: 0.1 to 1.2 wt %

It is generally known that when a large amount of silicon is added to steel, a silicon oxide layer is formed on the surface to inhibit coatability. However, in the case of steel containing a large amount of manganese as in the present disclosure, when a proper amount of silicon is contained, a thin silicon oxide layer is formed on the surface to inhibit the oxidation of manganese, and thus, formation of a thick manganese oxide layer after cold rolling may be prevented and corrosion progressed in the cold rolled steel sheet after annealing may be prevented to enhance surface quality. In addition, due to the effect of inhibiting formation of a manganese oxide layer, the hot dip galvanizing properties may be significantly improved. In order to exhibit such an effect in the present disclosure, 0.1 wt % or more of silicon is preferably included. However, if the silicon content is excessive, acid pickling characteristics are deteriorated due to formation of excessive silicon oxide, which may deteriorate surface quality of the hot-rolled steel sheet and may reduce wettability of the molten metal to degrade coatability. Therefore, the upper limit of the silicon content is preferably 1.2%.

According to an example, the contents of Al and Si contained in the base steel sheet may satisfy the following relational expression 1. If the value of $[Al]_b/[Si]_b$ is too low, workability may deteriorate due to an Si oxide remaining at the interface and the presence of a large amount of Si and Si-based phases which are susceptible to working. Therefore, the value of $[Al]_b/[Si]_b$ is preferably controlled to 1.0 or greater, and more preferably, controlled to 2.5 or greater. Meanwhile, if the $[Al]_b/[Si]_b$ value is excessively high, the Fe—Al-based alloy phase is excessively developed and an intermetallic compound with brittleness may be generated to degrade workability and coating adhesion. Therefore, the value of $[Al]_b/[Si]_b$ is preferably controlled to 10 or less, and, more preferably, to 7 or less.

$$1.0 \leq [Al]_b/[Si]_b \leq 10 \quad \text{[Relational expression 1]}$$

(here, $[Al]_b$ and $[Si]_b$ each denote the content (wt %) of the corresponding elements included in the base steel sheet).

Further, according to an example, the content of Mn, Al and Si contained in the base steel sheet may satisfy the following relational expression 2. If the value of $[Mn]_b/([Al]_b+[Si]_b)$ is too low, Al and/or Si oxides are concentrated on the surface to deteriorate wettability of hot-dipping and make it difficult to form an intended alloy layer to degrade workability. Therefore, the value of $[Mn]_b/([Al]_b+[Si]_b)$ is preferably controlled to 5.0 or greater, and more preferably, to 6.0 or greater. Meanwhile, if the value of $[Mn]_b/([Al]_b+[Si]_b)$ is excessively high, the Fe—Al alloy phase may be excessively produced and the Si—Mn-based intermetallic compound phase disadvantageous to workability is included to degrade workability and coating adhesion. Therefore, the value of $[Mn]_b/([Al]_b+[Si]_b)$ is preferably controlled to 12.0 or less, and more preferably, to 10.0 or less.

$$5.0 \leq [Mn]_b/([Al]_b+[Si]_b) \leq 12.0 \quad \text{[Relational expression 2]}$$

(Here, $[Mn]_b$, $[Al]_b$, and $[Si]_b$ each denote the content (wt %) of the corresponding elements included in the base steel sheet).

According to an example, the base steel sheet 10 may contain one or more selected from the consisting of, by weight, 0.3 to 0.9% of C, 0.01 to 0.5% of Ti, 0.05 to 0.5% of V, 0.0005 to 0.0050% of B, 0.01 to 0.5% of Cr, 0.01 to 0.5% of Mo, 0.01 to 0.05% of Nb, and 0.01 to 0.1% of Sn.

C: 0.3 to 0.9%

Carbon serves to stabilize the austenite phase. If the carbon content is less than 0.3%, an α'-martensite phase may be produced to cause cracking during processing to degrade ductility. Meanwhile, if the carbon content exceeds 0.9%, stability of the austenite phase may be significantly increased, but, as a result, workability may be lowered due to transition of a transformation behavior based on slip transformation.

Ti: 0.01 to 0.5%

Titanium is a strong carbide forming element that bonds with C to form a carbide. The carbide formed here inhibits growth of crystal grains to effectively work to grain refinement. If the titanium content is less than 0.01%, the crystal grains may grow excessively to coarsen a crystal grain size. Meanwhile, if the Ti content exceeds 0.5%, titanium may segregate in crystal grain boundaries and cause grain boundary embrittlement.

V: 0.05 to 0.5%

Vanadium is a strong carbide forming element that bonds with C to form a carbide, like Ti, Nb, etc., and serves to form a fine precipitation phase at a low temperature to perform precipitation strengthening. If the content of vanadium is less than 0.05%, the precipitation strengthening effect may be lowered and an effective increase in strength may not be obtained. Meanwhile, if the vanadium content is more than 0.5%, the precipitation phase is excessively coarsened to degrade a growth effect of a crystal grain.

B: 0.0005 to 0.0050%

Boron is dissolved in columnar grain boundaries at 1,000° C. to suppress generation and migration of vacancies, serving to strengthening the columnar grain boundaries. If the boron content is less than 0.0005%, the effect of strengthening the grain boundaries may be too low or may not be obtained. Meanwhile, if the boron content is more than 0.0050%, a large amount of carbides or nitrides acting as precipitation nuclei of loose primary aluminum may be generated to accelerate precipitation of the loose primary aluminum.

Cr: 0.01 to 0.5%

Chromium serves to suppress formation of the α'-martensite phase on a steel surface during hot rolling and improve workability of the steel. If the content of chromium is less than 0.01%, hot workability may deteriorate. Meanwhile, if the content of chromium exceeds 0.5%, when the content of chromium acting as a ferrite stabilizing element is increased, generation of α'-martensite phase may be accelerated to degrade ductility of the steel.

Mo: 0.01 to 0.5%

Molybdenum is added to improve resistance to secondary work brittleness and plating ability. If the molybdenum content is less than 0.01%, there is a possibility of causing secondary work brittleness. Meanwhile, if the molybdenum content is more than 0.5%, the improvement effect may be reduced and cost may increase.

Nb: 0.01 to 0.05%

Niobium is a strong carbide forming element that bonds with C to form a carbide. The carbide is effective in inhibiting growth of crystal grains and refining crystal grains. If the niobium content is less than 0.01%, the crystal grains may coarsen and the precipitation strengthening effect may not be obtained. Meanwhile, if the niobium content is more than 0.05%, a precipitation phase may be excessively coarsened to deteriorate the crystal grain growth effect.

Sn: 0.01 to 0.1%

Since tin does not form an oxide film by itself at high temperature, tin precipitates on a surface of a substrate during annealing before hot dipping to inhibit pro-oxidizing elements such as Al, Si and Mn from being diffused on the surface to improve coatability. If the tin content is less than 0.01%, coating wettability may deteriorate to cause unplating or plating defects, and if the tin content is more than 0.1%, hot shortness may occur to deteriorate hot workability.

The aluminum-based coated layer 30 is formed on the surface of the base steel sheet to contribute to improvements in corrosion resistance of the base steel sheet. In the present disclosure, a composition of the aluminum-based coated layer is not limited and may be a pure aluminum coated layer or an aluminum-based alloy coated layer containing Si, Mg, or the like. Hereinafter, the types of the elements that may be contained in the aluminum-based alloy coated layer and the content ranges thereof will be described in detail.

Si: 3 to 12 wt %

When good workability or oxidation resistance is required, a certain amount of Si is preferably added. However, excessive addition of Si may excessively raise the temperature of a plating bath and a coarse Si primary crystal may be generated to degrade corrosion resistance and workability. Therefore, the content of Si is preferably 3 to 12 wt %.

Mg: 0.1 to 10 wt %

When excellent corrosion resistance is required, it is preferable to add a predetermined amount of Mg. The addition of Mg also helps to reduce the occurrence of unplating. However, if the Mg content is excessive, the effect of improving corrosion resistance and improving plating properties is saturated and costs are increased. Therefore, the content of Mg is preferably 0.1 to 10 wt % and, more preferably, 4 to 8 wt %.

At least one selected from the group consisting of 0.001 to 5 wt % of Ca, 0.005 to 2 wt % of Sr, 0.01 to 2 wt % of Mn, 0.01 to 2 wt % of Cr, 0.01 to 2 wt % of Mo and 0.1 to 10 wt % of Sn.

These elements form a thin passive state film on the surface of the coated layer to suppress a surface reaction and suppress a reaction with a corrosion-inducing electrolytic material in the periphery, further improving corrosion resistance of the coated steel sheet. However, if the content thereof is excessive, it may be advantageous in terms of corrosion resistance but a large amount of dross may be generated in the plating bath at the time of plating to cause a plating defect.

The alloy layer 20 is formed at the interface between the base steel sheet 10 and the hot-dip aluminum-coated layer 30 to contribute to improvement of coating adhesion.

The alloy layer 20 includes an Fe—Al—Si—Mn-based alloy phase and includes 40 to 70 wt % of Al, 2 to 13 wt % of Si, 3 to 9 wt % of Mn, the balance Fe and inevitable impurities.

Al: 40 to 70 wt %

Al contained in the alloy layer contributes to improvement of workability of the coated steel sheet and improvement of uniformity of the alloy layer. If the content is too low, uniformity of the alloy layer may be deteriorated, and therefore, the Al is preferably contained in an amount of 40 wt % or more. However, if the content is too high, workability of the coated steel sheet may be deteriorated, and thus, the Al content is preferably 70 wt % or less.

Si: 2 to 13 wt %

Si contained in the alloy layer suppresses excessive growth of the alloy layer and suppresses a reaction between Fe and Al, contributing to improvement of workability of the coated steel sheet. In order to obtain such an effect in the present disclosure, Si is preferably contained in an amount of 2 wt % or more. However, if the Si content is excessive, the effect may be saturated and weldability may deteriorate, and thus, the Si content is preferably 13 wt % or less.

Mn: 3 to 9 wt %

Mn contained in the alloy layer contributes to improving the workability of the coated steel sheet. In order to obtain such an effect in the present disclosure, Mn is preferably contained in an amount of 3 wt % or more. However, if the Mn content is excessive, a phase disadvantageous for processing in the alloy layer, for example, an alloy phase estimated to be an R-based or nu-based alloy phase containing an excessive amount of Mn and Si may be formed in the Fe—Al—Mn—Si composite alloy to significantly degrade workability. Therefore, an upper limit of the Mn content is preferably 9 wt %.

Balance: Fe and Inevitable Impurities

The alloy layer may contain Fe and inevitable impurities in addition to Al, Si, and Mn defined in the content. Here, the impurities may include all prescribed components included in the steel other than Al, Si, and Mn, inevitable impurities included in the steel, and inevitable impurities included in the plating.

According to an example, the alloy layer 20 may further contain 1 wt % or less (excluding 0%) of Mg. Mg contained in the alloy layer may also contribute to improvements in corrosion resistance of the coated steel sheet. If the Mg content exceeds 1 wt %, the effect is saturated, and thus, in the present disclosure, an upper limit of the Mg content is limited to 1 wt %.

According to an example, the alloy layer 20 may have a thickness of 0.1 to 10 μm. If the thickness of the alloy layer is too small, it may be difficult to ensure sufficient adhesion between the base steel sheet and the coated layer. Therefore, a lower limit of the thickness of the alloy layer may be limited to 0.1 μm, and more preferably, to 3 μm from the viewpoint of ensuring sufficient adhesion between the base steel sheet and the coated layer. However, if the thickness is too large, the workability of the coated steel sheet may deteriorate. Therefore, from the viewpoint of preventing this, the upper limit of the alloy layer thickness may be limited to 10 μm, more preferably, to 7 μm.

According to an example, the thickness of the alloy layer may satisfy the following Relational expression 3. If the thickness of the alloy layer does not satisfy the following Relational expression 3, the thickness of the alloy layer may be excessively large and the adhesion of the coated layer may deteriorate.

$$T_a \leq (-0.78) \times [A] + 11.7$$

$$[A] = 0.75[Si]_p + 0.15[Si]_b + 0.10[Al]_b \quad \text{[Relational expression 3]}$$

(Here, $T_a$ denotes the thickness (μm) of the alloy layer, $[Si]_p$ denotes the content (wt %) of the corresponding element included in the hot-dip aluminum-coated layer, and $[Si]_b$ and $[Al]_b$ each denote the content (wt %) of the corresponding elements included in the base steel sheet).

The above-described coated steel sheet of the present disclosure may be produced by various methods and a production method thereof is not limited. However, in one embodiment thereof, by controlling cooling conditions after plating, a hot-dip aluminum-coated steel sheet having the alloy layer satisfying the above-mentioned composition and thickness may be secured.

That is, the base steel sheet having the above-mentioned composition may be dipped in a plating bath, a coating weight is adjusted, and cooling is subsequently performed by jetting a gas, a liquid or a mixture of a gas and a liquid, whereby the hot-dip aluminum-coated steel sheet having the alloy layer satisfying the above-mentioned composition and thickness may be secured. The medium to be jetted is not limited. That is, the gas may include air, nitrogen, other gases, or a mixture of these gases, and the liquid may include water, an aqueous phosphoric acid solution, or other liquid used for cooling.

After the plating, primary cooling may be performed at 250 to 350° C., a cooling rate is 3 to 10° C./sec., and secondary cooling may be performed at room temperature in cooling water. The primary cooling may affect densification of the coated structure and formation of an alloy phase when the coated metal coagulates, and if the temperature of cooling exceeds 350° C., the coated structure may be easily damaged and a fine surface may not be obtained. If the temperature of cooling is lower than 250° C., surface detects such as a fitting mark, or the like, may be generated, cooling facilities are increased, and the amount of refrigerant used is increased, which is, thus, not desirable. If the cooling rate is less than 3° C./sec., the coated structure is coarse and surface uniformity is poor. If the cooling rate exceeds 10° C./sec., a refrigerant stain is formed on the surface and a surface defect may occur. Meanwhile, the secondary cooling may be performed by dipping the steel sheet in cooling water.

Meanwhile, except for cooling after plating, the hot-dip aluminum-based coated steel sheet may be manufactured according to general manufacturing of a hot-dip aluminum-based coated steel sheet.

MODE FOR INVENTION

Hereinafter, the present disclosure will be described more specifically by way of embodiments. It should be noted, however, that the following embodiments are intended to illustrate and specify the present disclosure and do not to limit the scope of the present disclosure. The scope of the present disclosure is determined by the matters described in the claims and the matters reasonably deduced therefrom.

A steel slab having the composition of Table 1 below was heated to a temperature of 1200° C., hot rolled at 860° C., rolled at 620° C., and then air-cooled to obtain a hot-rolled steel sheet. Thereafter, an oxide on the surface of the hot-rolled steel sheet was removed with a hydrochloric acid solution, and then cold-rolled at a cold reduction rate of 70% to obtain a cold-rolled steel sheet having a thickness of 1.2 mm. Thereafter, the cold-rolled steel sheet was annealed under an atmosphere of $N_2$–10 vol % $H_2$ at 800° C. for 90 seconds, and then dipped in an aluminum-based plating bath (plating bath temperature: 600 to 680° C.) having the composition of Table 1 below to form an aluminum based coated layer on the surface of the cold-rolled steel sheet. Thereafter, a coating weight was adjusted to 80 g/m² on the basis of one side by air wiping, primary cooling was performed at a cooling rate of 6° C./sec. to 300° C. using air and mist, and thereafter, second cooling was performed by dipping the steel sheet in cooling water.

Thereafter, the composition and the thickness of the alloy layer of each of the manufactured aluminum-coated steel sheets were measured, and the results are shown in Table 2 below. The composition of the alloy layer was calculated by performing SEM-EDS point analysis three times and subsequently averaging the same, and the thickness of the alloy layer was measured three times with an optical microscope at ×1000 magnification, and then an average value was calculated.

Coating adhesion and workability of each of the manufactured aluminum-coated steel sheets were evaluated, and the results are shown in Table 2 below.

As for coating adhesion, after a OT bending test, a bending external portion was taping-tested and delamination of the coated layer was evaluated on the basis of the following criteria.

⊚: No delaminated plating scrap was present on the tape and no delamination was observed on the bent surface ○: No delaminated plating scrap was present on the tape and a small amount of delamination was observed on the bent surface.

Δ: No delaminated plating scrap was present on the tape and some delamination was observed on the bent surface.

X: Delaminated plating scrap was present on the tape and observed with the naked eye.

In addition, as for workability, after the OT-bending test, a deformed surface was observed, a crack width was measured, and workability was evaluated based on the following criteria.

⊚: No cracks on the observed surface

○: Cracks were generated on the observed surface, and the width of all cracks was 5 μm or less Δ: Cracks were generated on the observed surface, the width of most cracks was 5 μm or less, and some exceeded 5 μm in width.

x: Cracks were generated on the observed surface, and the width of most cracks exceeded 5 μm

TABLE 1

| Remark | Component of base steel sheet (wt %) | | | | | Component of plating bath (wt %) | |
|---|---|---|---|---|---|---|---|
| | Mn | Al | Si | $[Al]_b/[Si]_b$ | $[Mn]_b/([Al]_b + [Si]_b)$ | Si | Mg |
| Inventive example 1 | 5 | 0.3 | 0.3 | 1.0 | 8.3 | 3 | 5 |
| Inventive example 2 | 5 | 0.3 | 0.3 | 1.0 | 8.3 | 12 | 5 |
| Inventive example 3 | 15 | 2 | 0.3 | 6.7 | 6.5 | 11 | 0 |
| Inventive example 4 | 17 | 1.3 | 0.5 | 2.6 | 9.4 | 11 | 5 |
| Inventive example 5 | 15 | 2 | 0.3 | 6.7 | 6.5 | 12 | 5 |
| Inventive example 6 | 25 | 2 | 1.2 | 1.7 | 7.8 | 3 | 5 |
| Inventive example 7 | 25 | 2 | 1.2 | 1.7 | 7.8 | 11 | 5 |
| Inventive example 8 | 12 | 1.2 | 0.6 | 2.0 | 6.7 | 11 | 5 |
| Inventive example 9 | 20 | 3 | 0.3 | 10.0 | 6.1 | 11 | 5 |
| Inventive example 10 | 25 | 2 | 0.8 | 2.5 | 8.9 | 11 | 5 |
| Inventive example 11 | 35 | 3 | 0.3 | 10.0 | 10.6 | 11 | 5 |
| Comparative example 1 | 2.5 | 0.1 | 0.3 | 0.3 | 6.3 | 11 | 0 |
| Comparative example 2 | 2.5 | 0.1 | 0.3 | 0.3 | 6.3 | 2 | 5 |
| Comparative example 3 | 2.5 | 0.1 | 0.3 | 0.3 | 6.3 | 11 | 5 |
| Comparative example 4 | 2.5 | 0.1 | 0.3 | 0.3 | 6.3 | 15 | 5 |
| Comparative example 5 | 40 | 10 | 0.3 | 33.3 | 3.9 | 11 | 0 |
| Comparative example 6 | 40 | 10 | 0.3 | 33.3 | 3.9 | 2 | 5 |
| Comparative example 7 | 40 | 10 | 0.3 | 33.3 | 3.9 | 11 | 5 |

TABLE 1-continued

| Remark | Component of base steel sheet (wt %) | | | $[Al]_b/[Si]_b$ | $[Mn]_b/([Al]_b+[Si]_b)$ | Component of plating bath (wt %) | |
|---|---|---|---|---|---|---|---|
| | Mn | Al | Si | | | Si | Mg |
| Comparative example 8 | 40 | 10 | 0.3 | 33.3 | 3.9 | 15 | 5 |
| Comparative example 9 | 40 | 0.1 | 0.3 | 0.3 | 100.0 | 11 | 5 |

TABLE 2

| Remark | Composition of alloy layer (wt %) | | | | Thickness of alloy layer (μm) | Plating adhesion | Work-ability |
|---|---|---|---|---|---|---|---|
| | Al | Mn | Si | Mg | | | |
| Inventive example 1 | 52 | 3.9 | 2.8 | 1.0 | 10.0 | ○ | ○ |
| Inventive example 2 | 40 | 3.0 | 13.0 | 0.1 | 4.5 | ○ | ○ |
| Inventive example 3 | 56 | 6.6 | 9.5 | 0.5 | 4.9 | ◎ | ◎ |
| Inventive example 4 | 57 | 6.7 | 9.4 | 0.1 | 4.8 | ◎ | ◎ |
| Inventive example 5 | 52 | 5.4 | 12.8 | 0.1 | 4.3 | ◎ | ◎ |
| Inventive example 6 | 62 | 7.3 | 2.6 | 0.1 | 6.5 | ○ | ○ |
| Inventive example 7 | 59 | 6.6 | 9.0 | 0.1 | 2.8 | ○ | ○ |
| Inventive example 8 | 58 | 5.2 | 8.6 | 0.1 | 4.9 | Δ | ○ |
| Inventive example 9 | 61 | 6.5 | 9.2 | 0.1 | 4.6 | ○ | Δ |
| Inventive example 10 | 59 | 7.0 | 8.2 | 0.1 | 4.5 | Δ | ○ |
| Inventive example 11 | 66 | 7.8 | 8.5 | 0.1 | 4.6 | ○ | Δ |
| Comparative example 1 | 44 | 2.8 | 10.3 | 0.0 | 6.2 | Δ | X |
| Comparative example 2 | 48 | 3.5 | 1.5 | 0.1 | 12.5 | X | ○ |
| Comparative example 3 | 42 | 2.6 | 10.6 | 0.1 | 6.6 | Δ | X |
| Comparative example 4 | 35 | 2.2 | 14.8 | 0.1 | 5.4 | Δ | X |
| Comparative example 5 | 67 | 9.6 | 10.7 | 0.0 | 5.5 | ○ | Δ |
| Comparative example 6 | 78 | 10.5 | 1.8 | 0.1 | 11.2 | X | X |
| Comparative example 7 | 68 | 9.6 | 10.2 | 0.1 | 5.6 | ○ | X |
| Comparative example 8 | 66 | 9.2 | 14.4 | 0.1 | 3.8 | ○ | X |
| Comparative example 9 | 62 | 12.4 | 9.7 | 0.1 | 5.5 | X | X |

Referring to Table 2, it can be seen that, in the case of Inventive Examples 1 to 11 satisfying all the conditions proposed in the present disclosure, the composition and thickness of the alloy layers were appropriately controlled, and thus coating adhesion and workability were excellent.

The invention claimed is:

1. A high-manganese hot-dip aluminum-coated steel sheet comprising:
    a base steel sheet including, by weight, 5 to 35% of Mn, 0.3 to 6% of Al, 0.1 to 1.2% of Si, and a balance of Fe and inevitable impurities;
    a hot-dip aluminum-coated layer formed on a surface of the base steel sheet and including, by weight, 3 to 12% of Si, 0.1 to 10% of Mg, and a balance of Al and inevitable impurities; and
    an alloy layer formed at an interface between the base steel sheet and the hot-dip aluminum-coated layer, the alloy layer consisting of, by weight, 40 to 70% of Al, 2 to 13% of Si, 3 to 9% of Mn, 1% or less of Mg, and a balance of Fe and inevitable impurities,
    wherein the alloy layer has a thickness of 0.1 to 10 μm and includes an Fe—Al—Si—Mn-based alloy phase.

2. The high-manganese hot-dip aluminum-coated steel sheet of claim 1, wherein the contents of Al and Si included in the base steel sheet satisfy Relational expression 1 below:

$$1.0 \leq [Al]_b/[Si]_b \leq 10 \quad \text{[Relative expression 1]}$$

where $[Al]_b$ and $[Si]_b$ denote contents (wt %) of Al and Si, respectively, included in the base steel sheet.

3. The high-manganese hot-dip aluminum-coated steel sheet of claim 1, wherein the contents of Mn, Al, and Si included in the base steel sheet satisfy Relational expression 2 below:

$$5.0 \leq [Mn]_b/([Al]_b+[Si]_b) \leq 12.0 \quad \text{[Relational expression 2]}$$

where $[Mn]_b$, $[Al]_b$, and $[Si]_b$ denote contents (wt %) of Mn, Al, and Si, respectively, included in the base steel sheet.

4. The high-manganese hot-dip aluminum-coated steel sheet of claim 1, wherein the base steel sheet further includes one or more selected from the group consisting of, by weight, 0.3 to 0.9% of C, 0.01 to 0.5% of Ti, 0.05 to 0.5% of V, 0.0005 to 0.0050% of B, 0.01 to 0.5% of Cr, 0.01 to 0.5% of Mo, 0.01 to 0.05% of Nb, and 0.01 to 0.1% of Sn.

5. The high-manganese hot-dip aluminum-coated steel sheet of claim 1, wherein the hot-dip aluminum-coated layer further includes at least one selected from the group consisting of, by weight, 0.001 to 5 wt % of Ca, 0.005 to 2 wt % of Sr, 0.01 to 2 wt % of Mn, 0.01 to 2 wt % of Cr, 0.01 to 2 wt % of Mo, and 0.1 to 10 wt % of Sn.

6. The high-manganese hot-dip aluminum-coated steel sheet of claim 1, wherein the thickness of the alloy layer is 3 to 7 μm.

7. The high-manganese hot-dip aluminum-coated steel sheet of claim 1, wherein the thickness of the alloy layer satisfies Relational expression 3 below:

$$T_a \leq (-0.78) \times [A] + 11.7$$

$$[A] = 0.75[Si]_p + 0.15[Si]_b + 0.10[Al]_b \quad \text{[Relational expression 3]}$$

where $T_a$ denotes a thickness (μm) of the alloy layer, $[Si]_p$ denotes contents (wt %) of Si included in the hot-dip aluminum-coated layer, and $[Si]_b$ and $[Al]_b$ denote contents (wt %) of Si and Al, respectively, included in the base steel sheet.

* * * * *